Patented Sept. 4, 1945

2,384,138

UNITED STATES PATENT OFFICE 2,384,138

PROCESS FOR REFINING DAMMAR RESINS

Norman C. Schultze, Baltimore, Md., assignor, by mesne assignments, to U. S. Industrial Chemicals, Inc., a corporation of Delaware No Drawing. Application May 29, 1942,
Serial No. 445,089

7 Claims. (Cl. 260—107)

This invention relates to the processing of natural resins which are soluble in organic solvents of the hydrocarbon type.

Natural resins have been further classified according to the following:

Class I. Dammar resins
   A—Batavia
   B—Singapore
Class II. East India resins (resins related to the dammars)
   A—Batu
   B—Black
   C—Pale East India Singapore (Rasak)
   D—Pale East India Macassar (Hiroe)
Class III. Copal resins
   A—Manila
     1. Melengket
     2. Loba
     3. Philippine Manilas (Almaciga)
     4. Pontianak
     5. Boea
   B—Congo
   C—Kauri
Class IV. Miscellaneous resins
   A—Accroides
   B—Elemi
   C—Mastic
   D—Sandarac I prefer to group the natural resins into three major groups.

Group I. Those which can be divided into alcohol soluble and alcohol insoluble constituents:
   A—Batavia
   B—Singapore
   C—Batu
   D—Black
   E—Pale East India Singapore
   F—Pale East India Macassar
Group II. Those which are alcohol soluble:
   A—Manila
   B—Kauri
   C—Accroides
   D—Mastic
   E—Sandarac
Group III. The insoluble type:
   A—Congo Group I includes the dammar resins and related resins which can properly be classed as dammars. These resins can be separated into two major constituents; namely, alcohol soluble portions, or alpha-resenes, and the alcohol insoluble portions, or beta-resenes. Group II represents the alcohol soluble resins, and Group III comprises the insoluble resins typified by Congo resins.

The natural resins have the disadvantage of containing dirt, insoluble matter and gelatinous, non-resinous particles. In order to remove the dirt and gelatinous matter, it is necessary for the consumer to process the resins. This involves added expenditures in time, tie-up of equipment, loss of solvent and resin.

A characteristic of the resins of Group I, in which are dammars, is that members of this group of crude resins are not completely compatible with common lacquer materials. To make them usable, they are generally treated by a process known as "dewaxing." An example of such a "dewaxing" procedure is as follows: Dissolve 100 pounds of resin in 40 pounds of toluene and 40 pounds of ethyl acetate. After solution is complete, 40 pounds of ethyl alcohol are added, the mixture is thoroughly agitated, and the "wax," or beta-resene, is allowed to settle out. The liquid and the precipitate are then subjected to a filtration or a clarifying operation which removes the precipitated "wax" together with other impurities such as bark, dirt, and sand.

Such methods of preparing "dewaxed" resins for commercial use have disadvantages. Some of the disadvantages are that the "dewaxed" resin solutions lack flexibility in formulation of given lacquers and varnishes because of the variable concentrations of the solvents present; that the solutions are otherwise variable in their contents; that they are likely to be darker than desirable because of solution of color bodies contained in the extraneous material (bark, dirt and the like) by the action of the "dewaxing" solvent; and that the "wax," or beta-resene, and varying quantities of the entrained solvent mixture are usually lost by the users of this group of resins.

An object of this invention is to produce purified natural resins of the Group I type in a solid form, substantially free of solvents and extraneous materials. The use of these purified solid resins will overcome the disadvantages of resin solutions obtained by treating the natural resins of that type by the familiar "dewaxing" or extraction methods. The invention is not limited to the preparation of solid resins, however. It is also applicable to the production of improved alpha-resene solutions of resins of Group I, or of "run" resins of that group. These solutions can be used directly to better advantage than the customary resin solutions.

A further object of this invention is to produce a commercial grade of beta-resene, or "wax," from resins comprising Group I, free of dirt and other extraneous matter, and also substantially free of alpha-resene or alcohol soluble resin.

In the process of this invention, resins of Group I are dispersed in an organic solvent which is a solvent for both the alpha-resene and the beta-resene, but not a solvent for the extraneous material, and which does not react with the resin; then the extraneous material is removed before any further processing which would tend to leach out color bodies and thus impart color to the products.

Other features, objects and advantages will appear from the descriptions that follow, it being understood, however, that the detailed descriptions are given by way of illustration and not by way of limitation, since various changes may be made in procedure without departing from the scope and spirit of the invention.

By way of illustration, the treatment of a grade of resin commonly known to the trade as dammar Singapore seeds, typifying resins of Group I, will be described, but it will be understood that the invention is applicable to the processing of other grades of Singapore dammars, as well as other resins of this group.

It may be further explained that when the natural resins are dissolved or dispersed in a solvent, the resulting dispersion is not readily freed of extraneous matter by filtration because of plugging of the pores of the filter medium by a gelatinous material. As a consequence, settling has generally been resorted to by the users of the dispersions of natural resins. Much time is lost through tie-up in storage, however, and the residual materials contain a large percentage of solvent and resin. In addition, certain cold cuts contain a cloud that settles very slowly, and finally, a large number of storage tanks is required for capacity.

Previously, it had been believed that the gelatinous substances referred to could not be removed by centrifuging. I have found, however, that after the resins have been dispersed in the primary solvent heretofore mentioned, gelatinous bodies, together with other extraneous materials—dirt, etc.—can be readily separated from the resin solution or dispersion by treatment in the supercentrifuge. Before this treatment, it is advantageous to remove relatively large particles of foreign material, either by coarse filtration or by ordinary centrifuging. The term "supercentrifuging" used herein means an operation in which centrifugal force is upwards to that of 13,200 times that of gravity. In ordinary centrifuging, the centrifugal force seldom exceeds 1,000 times that of gravity.

As a further novel practice in a process for the purification of natural resins, I have discovered a new process whereby the alcohol soluble portions of Group I resins are readily recovered in a solid form from the clarified solutions or dispersions. This novel practice comprises the addition of the resin, in solution in a water miscible solvent, to a suitable quantity of water. First, however, substantially all water immiscible solvents used in the "dewaxing" of resins of Group I should be removed or replaced by a water miscible solvent. The water-precipitated resins can be recovered from the precipitation mixture by decantation, filtration, or the like, and then dried.

To further illustrate this invention, one may choose such a solvent as toluene to disperse the crude resins of Group I. The primary solvent may comprise one or more of the following solvents, or mixtures of them: benzene, toluene, xylenes, volatile petroleum hydrocarbon fractions, solvent naphthas, and the like. I prefer that the resin be dispersed by adding it to the solvent or solvents with agitation at a solid concentration approximating 40%. Lower or higher concentrations may be used, the limiting factor being economic considerations. Removal of the large particles of extraneous matter may be accomplished by coarse filtration.

The resin solution from the coarse filtration process is then supercentrifuged for the removal of substantially all the fine solids and gelatinous material present. In certain instances it may be helpful to heat the coarse filtered resin solution or dispersion before supercentrifuging. This supercentrifuge effluent may be concentrated at either atmospheric pressure, or at a reduced pressure, before "dewaxing."

The clarified resin solution is "dewaxed" by the addition of an organic non-solvent for the "wax," such as ethyl alcohol, or the like. Other monohydric alcohols of 1–4 carbon atoms and 3–4 carbon atom ketones or mixtures may be used instead of, or with, ethyl alcohol. If the dewaxed resin is to be obtained in solid form, it is preferable that the dewaxing liquid be water miscible. If the refined resin is to be marketed as a solution, the dewaxing agent may be water immiscible.

Removal of the "wax" may be accomplished by filtration, decantation, etc. The "wax" may then be washed with a water-miscible non-solvent for the wax, or with mixtures of water-miscible non-solvents for the wax, to remove occluded alcohol-soluble resin. The solid "wax" is then subjected to any of the known methods of drying.

It is of significance that the "wax" from the usual "dewaxing" procedures is lost to the users of resins of Group I. This "wax," when free of extraneous matter, as obtained from the above process, is of value in the trade. It is a white amorphous material of low acid numbers and high melting points and imparts false body and a flat finish to varnishes.

The "dewaxed" resin solution or dispersion containing toluene and alcohol is subjected to distillation at atmospheric or diminished pressures for the removal of toluene. At this stage the "dewaxed" and purified alcohol-soluble portion of resins of Group I may be recovered as a concentrated alcoholic solution for direct use. Or, the distillation may be carried out in such a manner as to leave the resin dispersed in toluene. I may in certain instances disperse the clarified resin a variety of solvents at stated concentrations and remove the primary solvent and the "dewaxing" solvent at atmospheric or diminished pressures. It is highly desirable, however, to recover the resin in solid form, virtually free of solvent.

To this end the solutions or dispersions of resins of Group I, dispersed in a water miscible solvent, are fed into an amount of water of such quantity as to produce a non-tacky precipitate of the resin. It may be desirable to increase the concentration of the water-miscible solvent or solvents in the precipitating bath, in which event the temperature is lowered, to decrease the tendency of the precipitated resin to "block" or agglomerate.

The precipitate can be washed in this form, and may be subjected to such treatment as bleaching or neutralization. The bleaching agent, or the neutralizing agent, or a mixture of the two, may be placed in the water miscible solvent or solvents containing the resin, or the materials may be placed in the precipitating bath.

The precipitated resin is subjected to any of the known methods of drying. The dried refined "dewaxed" resins of Group I offer advantages over the untreated natural resins in flexibility of formulation. The processed resin is entirely soluble, as dirt and insoluble matter have been removed. The processed resins are of uniform quality and good color. The processed resins, being free of dirt and "wax," and in a solid form, can be used in plastics. When used with hot melts containing ethyl cellulose, the processed resins impart certain desirable characteristics.

To illustrate further the process of refining natural resins of Group I as explained above, the following specific example is given.

Twenty pounds of dammar resin, Singapore seeds grade, are dissolved in thirty pounds of toluene. The resultant solution or dispersion is coarse filtered through layers of cheese-cloth and is clarified by supercentrifuging. The supercentrifuged effluent is then subjected to distillation at a reduced pressure to remove a quantity of toluene sufficient to concentrate the supercentrifuged effluent to 75%–80% resin content. This distillation is carried out at 60 mm. pressure.

The resultant concentrated resin solution is poured into an amount of anhydrous alcohol equivalent to three times the weight of the resin, that is, into an amount of alcohol equal approximately to nine times the amount of toluene in the concentrated resin solution. The "wax," or beta-resene, which is thereby precipitated, is removed by filtration or centrifuging and washed with alcohol to remove occluded alcohol-soluble resin. The beta-resene is then dried.

The filtrates from the "dewaxing" and washing steps are combined and subjected to distillation at a pressure of 350 mm. During this distillation the conditions are such that substantially all of the toluene is removed. The distillation is stopped at the point where a suitable concentration of resin is obtained.

The "dewaxed" resin is recovered from the alcoholic solution by precipitation in water, the amount of water used being sufficient to reduce the alcoholic content to 5% by volume. Precipitation of the alcoholic resin solution in water will require agitation, which should be continued for a period of time, to insure "leaching" of the alcohol from the precipitated resin.

The resin suspended in the alcohol-water mixture is filtered off and washed with water, and dried.

The above procedure will produce a "wax" and an alpha-resene, or "dewaxed" dammar, both of commercial value, free from extraneous matter. The products are free flowing, finely divided solids.

The following percentage figures illustrate the results obtained in refining a typical lot of Singapore seeds dammar according to the process outlined above:

|  | Percent |
|---|---|
| Bark and sand from coarse filtration | 5.2 |
| Supercentrifuge sludge | .7 |
| "Wax" (beta-resene) | 10.2 |
| Dammar (dewaxed) | 81.8 |
| Loss | 2.1 |

The term "wax" as used in the accompanying claims, denotes the material present in certain natural resins which is insoluble in alcohol and is commonly designated "wax" in the trade.

I claim:

1. The process of refining natural resins containing filterable and non-filterable gelatinous impurities and "wax" which comprises dispersing the resin in an organic solvent for the resin and "wax," subjecting the dispersion to a coarse filtration to remove filterable impurities, subjecting the filtrate to supercentrifugal forces and thereby separating a sludge consisting of the gelatinous impurities and fine impurities not removed by the coarse filtration, displacing the solvent in the dispersion with an organic solvent for the resin in which the "wax" is insoluble, separating the "wax" from the dispersion and concentrating the dispersion.

2. The process of refining natural resins containing filterable and non-filterable gelatinous impurities and "wax" which comprises dispersing the resin in an organic solvent for the resin and "wax," subjecting the dispersion to a coarse filtration to remove filterable impurities, subjecting the filtrate to supercentrifugal forces and thereby separating a sludge consisting of the gelatinous impurities and fine impurities not removed by the coarse filtration, displacing the solvent in the dispersion with an organic solvent for the resin in which the "wax" is insoluble, separating the "wax" from the dispersion, concentrating the dispersion, and precipitating the resin therefrom.

3. The process of refining natural resins containing filterable and non-filterable gelatinous impurities and "wax" which comprises dispersing the resin in a hydrocarbon containing at least four and not more than ten carbon atoms, subjecting the dispersion to a coarse filtration to remove filterable impurities, subjecting the filtrate to supercentrifugal forces and thereby separating a sludge consisting of the gelatinous impurities and fine impurities not removed by the coarse filtration, displacing the solvent in the dispersion with an organic solvent for the resin in which the "wax" is insoluble, separating the "wax" from the dispersion and concentrating the dispersion.

4. The process of refining natural resins containing filterable and non-filterable gelatinous impurities and "wax" which comprises dispersing the resin in a hydrocarbon containing at least four and not more than ten carbon atoms, subjecting the dispersion to a coarse filtration to remove filterable impurities, subjecting the filtrate to supercentrifugal forces and thereby separating a sludge consisting of the gelatinous impurities and fine impurities not removed by the coarse filtration, displacing the solvent in the dispersion with an organic solvent for the resin in which the "wax" is insoluble, separating the "wax" from the dispersion, concentrating the dispersion, and precipitating the resin therefrom.

5. The process of refining natural resins containing filterable and non-filterable gelatinous impurities and "wax" which comprises dispersing the resin in an amount of organic solvent for the resin and "wax" such that the solid concentration of the dispersion is approximately 40%, subjecting the dispersion to a coarse filtration to remove filterable impurities, subjecting the filtrate to supercentrifugal forces and thereby separating a sludge consisting of the gelatinous impurities and fine impurities not removed by the coarse filtration, displacing the solvent in the dispersion with an organic solvent for the resin in which the "wax" is insoluble, separating the "wax" from the dispersion and concentrating the dispersion.

6. The process of refining natural resins containing filterable and non-filterable gelatinous impurities and "wax" which comprises dispersing the resin in an organic solvent for the resin and "wax," subjecting the dispersion to a coarse filtration to remove filterable impurities, subjecting the filtrate to supercentrifugal forces and thereby separating a sludge consisting of the gelatinous impurities and fine impurities not removed by the coarse filtration, concentrating the filtrate from which the sludge was separated to a solid concentration of approximately 75% to 80%, displacing the solvent in the dispersion with an organic solvent for the resin in which the "wax" is insoluble, separating the "wax" from the dispersion, and recovering the resin from the remaining dispersion.

7. The process of refining natural resins containing filterable and non-filterable gelatinous impurities and "wax" which comprises dispersing the resin in an organic solvent for the resin and "wax," subjecting the dispersion to a coarse filtration to remove filterable impurities, subjecting the filtrate to supercentrifugal forces and thereby separating a sludge consisting of the gelatinous impurities and fine impurities not removed by the coarse filtration, concentrating the filtrate from which the sludge was separated to a solid concentration of approximately 75% to 80%, displacing the solvent in the dispersion with an amount of organic solvent for the resin, in which the "wax" is insoluble, equal approximately to nine times the amount of solvent in the dispersion, with resultant precipitation of "wax," separating the "wax" from the dispersion, and recovering the resin from the remaining dispersion

NORMAN C. SCHULTZE.